United States Patent Office 2,783,266
Patented Feb. 26, 1957

2,783,266

PRODUCTION OF NITRILES

William G. Toland, Jr., San Rafael, Calif., assignor to California Research Corporation, San Francisco, Calif., a corporation of Delaware No Drawing. Application May 19, 1953,
Serial No. 356,097

6 Claims. (Cl. 260—465)

This invention relates to a process for producing nitriles. More particularly, it relates to a process for converting the terminal carbon atom of an alkyl group attached to a carbocyclic or heterocyclic ring to a cyano group.

Pursuant to the invention, a substantially anhydrous mixture of sulfur, ammonia and an alkyl substituted cyclic compound is heated to a temperature in the range from 400 to 700° F. to produce a reaction product mixture comprising nitriles and hydrogen sulfide. Substantially all of the hydrogen sulfide is evaporated from the reaction product mixture while the mixture is at a temperature in the range from 350 to 700° F., leaving a normally liquid or normally solid nitrile product. The reaction is desirably carried out at a superatmospheric pressure sufficient to maintain a liquid phase in the reaction zone. Additionally, the reaction is desirably conducted in the presence of an inert diluent.

A considerable variety of alkyl substituted cyclic compounds can be converted to nitriles pursuant to the invention. Good conversions and yields are obtained when the alkyl group of the alkyl substituted cyclic compound contains 1 to 4 carbon atoms. When the reaction is attempted with alkyl substituted cyclic compounds containing more than 4 carbon atoms in the alkyl group, varying degrees of conversion to nitrile are obtained, but losses of the feed to undesired side reaction products are ordinarily high. Pursuant to the invention, toluene is converted to benzonitrile; ethylbenzene is converted to phenylacetonitrile; cumene is converted to hydrotropic nitrile; xylenes are converted to tolunitriles and phthalonitriles; trimethyl and tetramethylbenzenes are converted to polynitriles, each of the methyl groups being converted to a cyano group if suitable proportions of the reactants are charged to the reaction zone. Alkyl thiophenes are converted to nitriles, the alkyl groups behaving in the same manner in the conversion as alkyl groups attached to a benzene ring. Similarly, alkyl pyridines are converted to cyanopyridines; alkyl furans are converted to cyanofurans; and alkyl naphthalenes are converted to cyanonaphthalenes. In all of these reactions the alkyl groups behave in the same manner, the carbon atom of the alkyl group most remote from the cyclic ring being converted to a cyano group.

The reaction proceeds at acceptable rates at temperatures in the range from 400 to 700° F., temperatures from 450 to 650° F. being preferred.

As indicated above, the reaction is desirably conducted at superatmospheric pressures sufficient to maintain a liquid phase in the reaction zone. The pressures employed are ordinarily in the range from 500 to 5000 p. s. i. g.

Theoretically, 3 gram atoms of sulfur and 1 mole of ammonia are required to convert 1 alkyl group to a cyano group or to an alkyl cyano group. For example, when toluene, ethylbenzene, or cumene is charged to the reaction zone, 3 gram atoms of sulfur and 1 mole of ammonia are the minimum amounts of these materials which can be employed for theoretically complete conversion to the nitrile. If a xylene is charged to the reaction zone, 6 gram atoms of sulfur and 2 moles of ammonia are theoretically required for complete conversion of the xylene to a phthalonitrile. Similarly, if an alkylbenzene or a tetraalkylbenzene is charged to the reaction zone, 9 gram atoms of sulfur and 3 moles of ammonia are required for complete conversion of the trialkylbenzene to a trinitrile and 12 moles of sulfur and 4 moles of ammonia are required for conversion of the tetraalkylbenzene to a tetranitrile. Somewhat more than theoretical amounts of sulfur can be employed. The amount of sulfur charged should not exceed twice the amount theoretically required for the conversion of all of the alkyl groups of the feed to cyano groups since excessive quantities of sulfur tend to increase losses to side reaction products. A large excess of ammonia ranging from 2 to 25 times the theoretical amount is desirably employed, the large excess having a tendency to suppress losses of the feed stock to side reactions.

The reaction is desirably conducted in the presence of a substantial amount of an inert diluent in order to minimize losses of the feed stock to side reactions. 2 to 20 volumes or more of diluent per volume of feed are effective in this respect. The diluent is inert in the sense that it is not attacked by the sulfur and ammonia under the conditions of the reaction. Benzene is the material preferred for use as the diluent, but other materials such as thiophene, pyridine, and quinoline may be employed.

The process of the invention is illustrated by the following examples:

Example 1

Para-xylene, sulfur and ammonia in amounts such that the respective mole ratios were 10:4.2:7 were charged to a bomb reactor which was sealed and heated to 600° F. for a period of 50 minutes. At the end of that period the bomb was cooled to 430° F. and vapors were bled from the bomb until the effluent vapor was substantially free of hydrogen sulfide. The bomb was then cooled to atmospheric temperature and opened. The product was worked up by steam stripping to remove residual ammonia and fractionally distilling the stripped product to separate unconverted xylene, tolunitrile and phthalonitrile as separate overhead cuts. Alternatively, substantially all of the reaction product including hydrogen sulfide, ammonia, unconverted hydrocarbon and nitrile can be vaporized from the bomb. When this method is used the vapors are passed into a large body of water. Hydrogen sulfide and ammonia dissolve in the water, and the unconverted hydrocarbon and nitrile form a distinct organic phase which is separated and fractionally distilled to recover the nitrile. 27.3% of the para-xylene was converted and 60% of the converted material was para-tolunitrile.

Example 2

Meta-xylene, sulfur and ammonia were charged to a bomb reactor in amount such that the respective mole ratio was 1:6.2:10. Ten moles of benzene were added for each mole of meta-xylene charged. The bomb was then sealed and heated to 600° F. for a period of 60 minutes. The maximum pressure attained during the heating was 2200 p. s. i. g. Vapors were bled from the bomb beginning at a temperature of 580° F. and continuing until the temperature had dropped to 520° F. The reaction product was worked up as in Example 1, and a yield of 24% of meta-tolunitrile was obtained.

Example 3

Cumene, sulfur and ammonia in molar proportions of 1:3:5 were charged to a bomb reactor. Ten moles of benzene per mole of cumene were charged to the bomb which was then sealed and heated to 550° F. for 120 minutes. Gases were bled from the bomb at 500 to 520°

F. until the effluent gas was substantially free of hydrogen sulfide. Hydrotropic nitrile was recovered from the reaction product in 28% yield. Sixty-two percent of the cumene was consumed.

Example 4 p-tolunitrile, sulfur and ammonia in molar proportions of 1:5.6:20 were charged to a bomb reactor. Ten moles of benzene per mole of tolunitrile were added to the reactor which was then sealed and heated to 625° F. for 90 minutes. A maximum pressure of 2300 p. s. i. g. was obtained. Vapors were bled from the bomb at 590 to 620° F. until the effluent vapors were substantially free of hydrogen sulfide. 85% of the tolunitrile was converted, and 73% of the converted material was recovered as terephthalonitrile.

Example 5

Beta-picoline, sulfur and ammonia were charged to a bomb reactor in molar proportions of 1:3:20. Ten moles of benzene per mole of beta-picoline were charged to the reactor, which was then sealed and heated to 630° F. for 80 minutes. The maximum pressure obtained was 3900 p. s. i. g. Vapors were bled from the bomb at 550 to 600° F. Substantially all of the reaction product was removed as vapor and passed into water. A yield of 15 mole percent of nicotinic nitrile was obtained. In addition, the water had an appreciable content of nicotinic amide which was produced by partial hydrolysis of nicotinic nitrile.

Example 6

When Example 5 is repeated, substituting beta-methylthiophene for beta-picoline, 3-cyanothiophene is recovered from the reaction product as in Example 5.

The above examples indicate that nitriles may be produced at good conversions and yields pursuant to the invention and that an alkyl benzonitrile is converted to a benzonitrile pursuant to the invention.

I claim:

1. A process for producing nitriles which comprises heating a substantially anhydrous mixture of sulfur, ammonia and a lower alkyl benzene in a closed reaction zone to a temperature in the range from 400 to 700° F. until a superatmospheric hydrogen sulfide pressure is generated in the reaction zone, maintaining the reaction product mixture at approximately reaction temperature and withdrawing vapors from the reaction mixture until the effluent vapors are substantially free of hydrogen sulfide.

2. A process for producing nitriles which comprises heating a substantially anhydrous mixture of sulfur, ammonia and a lower alkyl benzene in a reaction zone to a temperature in the range from 450 to 650° F. under a superatmospheric pressure sufficient to maintain a liquid phase in the reaction zone to produce a reaction product mixture comprising nitriles and hydrogen sulfide and evaporating substantially all of the hydrogen sulfide from the reaction product mixture while the mixture is at approximately reaction temperature.

3. The method as defined in claim 2, wherein the hydrogen sulfide is evaporated from the reaction product mixture while maintaining the reaction product mixture at a temperature in the range 400° to 650° F.

4. The method as defined in claim 2, wherein the pressure in the reaction zone is in the range from 500 to 5000 p. s. i. g.

5. A process for producing nitriles which comprises heating a substantially anhydrous mixture of sulfur, ammonia, an alkyl aromatic compound having 1 to 4 carbon atoms in each alkyl group and 2 to 20 volumes of benzene per volume of alkyl aromatic compound to a temperature in the range from 450 to 650° F. under a superatmospheric pressure in the range from 500 to 5000 p. s. i. g. to produce a reaction product mixture comprising nitriles and hydrogen sulfide and evaporating substantially all of the hydrogen sulfide from the reaction product mixture while maintaining the mixture at a temperature in the range from 400 to 650° F.

6. A process for producing phthalonitrile which comprises heating a substantially anhydrous mixture of a xylene, approximately 6 gram atoms of sulfur per mol of xylene, and 4 to 50 mols of ammonia per mol of xylene to a temperature in the range 450° to 650° F. under a superatmospheric pressure in the range 500 to 5000 p. s. i. g. and bleeding vapors from the reaction product mixture while still at approximately reaction temperature until the effluent vapor is substantially free of hydrogen sulfide.

References Cited in the file of this patent

UNITED STATES PATENTS

| | | |
|---|---|---|
| 2,421,031 | Mahan | May 27, 1947 |
| 2,459,706 | King | Jan. 18, 1949 |
| 2,610,980 | Naylor | Sept. 16, 1952 |